United States Patent [19]
Doolittle

[11] 3,810,595
[45] May 14, 1974

[54] AIRCRAFT ARRESTING BARRIER

[75] Inventor: Donald B. Doolittle, Wilmington, Del.

[73] Assignee: All American Industries, Inc., Wilmington, Del.

[22] Filed: Dec. 5, 1972

[21] Appl. No.: 312,254

[52] U.S. Cl............................................. 244/110 C
[51] Int. Cl.............................................. B64f 1/02
[58] Field of Search........ 244/110 R, 110 A, 110 C, 244/110 E, 110 F, 63

[56] References Cited
UNITED STATES PATENTS

| | | | |
|---|---|---|---|
| 3,069,118 | 12/1962 | Bernard | 244/110 R |
| 3,468,500 | 9/1969 | Carlsson | 244/110 C |
| 3,367,608 | 2/1968 | Charno et al. | 244/110 C |
| 3,207,459 | 9/1965 | Kinch | 244/110 R |
| 2,854,201 | 9/1958 | Cotton | 244/110 R |
| 3,212,736 | 10/1965 | Fonden et al. | 244/110 R |
| 3,454,244 | 7/1969 | Walander | 244/110 C |

FOREIGN PATENTS OR APPLICATIONS

| | | | |
|---|---|---|---|
| 859,670 | 1/1961 | Great Britain | 244/110 |

Primary Examiner—Milton Buchler
Assistant Examiner—Paul E. Sauberer
Attorney, Agent, or Firm—Connolly and Hutz

[57] ABSTRACT

An array of open loops having a maximum dimension slightly smaller than the wing spread of an aircraft to be arrested are laterally detachably hung from a pair of suspension lines stretched above and across the runway. A number of these arrays are staggered relative to each other to provide enough of the loops to securely engage and restrain an aircraft which penetrates any portion of the barrier. Slide connectors attach lower portions of the loop to a horizontal cross runway linear component attached to an energy absorbing device. When an aircraft impinges upon the barrier, the loops break away from the suspension line and freely move to engage stronger larger dimensional portions of the aircraft and apply the restraint of the energy absorbing device to the aircraft from behind and below it. The loops are conveniently deployed in a pentagonal configuration with their peaked tops connected to the suspension lines, their sides breakably connected to each other and bottoms attached by the slide connectors to the cross runway energy absorbing lines—one for each array. The lower cross runway lines are bunched together for optional engagement by a hook-equipped aircraft. The horizontal deployment of the slide connectors behind the vertically deployed loops permits the nose wheels of the aircraft to pass over and clear the cross runway lines before the engaging movement of the barrier is actuated. The upper suspension lines and loops are effectively made of relatively unyielding materials, such as a relatively inelastic textile or a textile covered metallic cable and the lower horizontal linear components are efficiently provided by an energy absorbing material, such as nylon.

21 Claims, 9 Drawing Figures

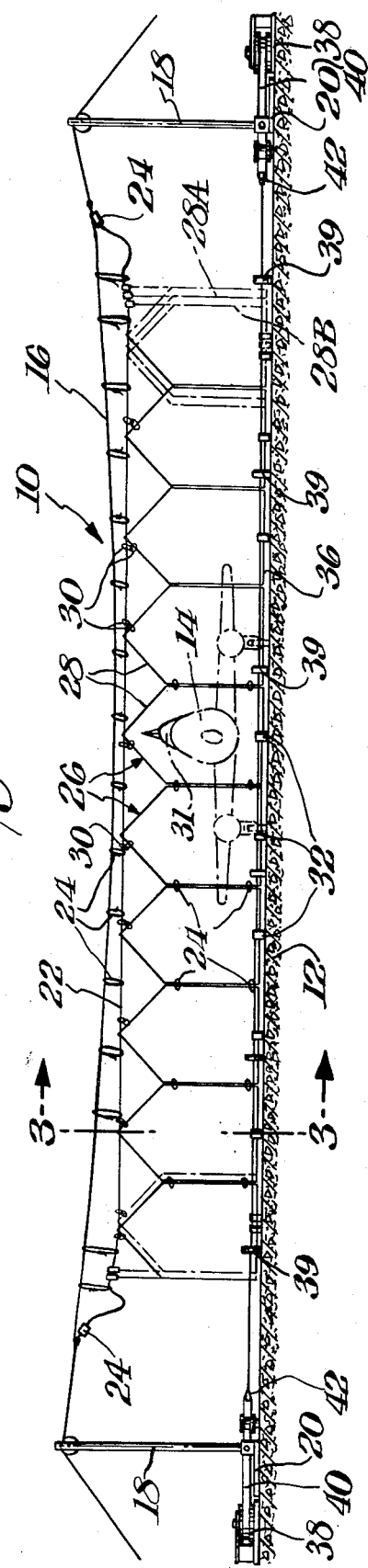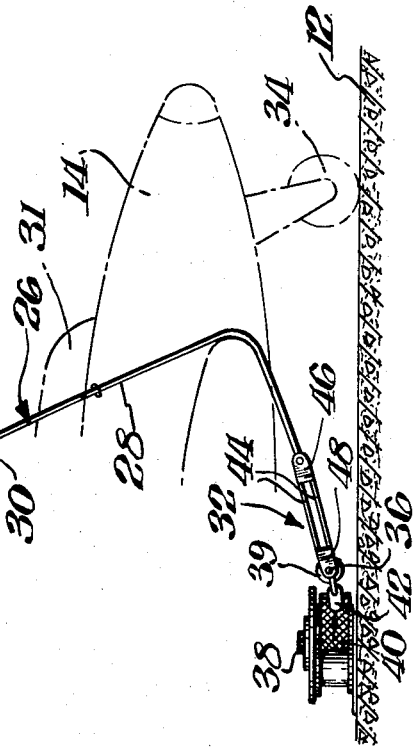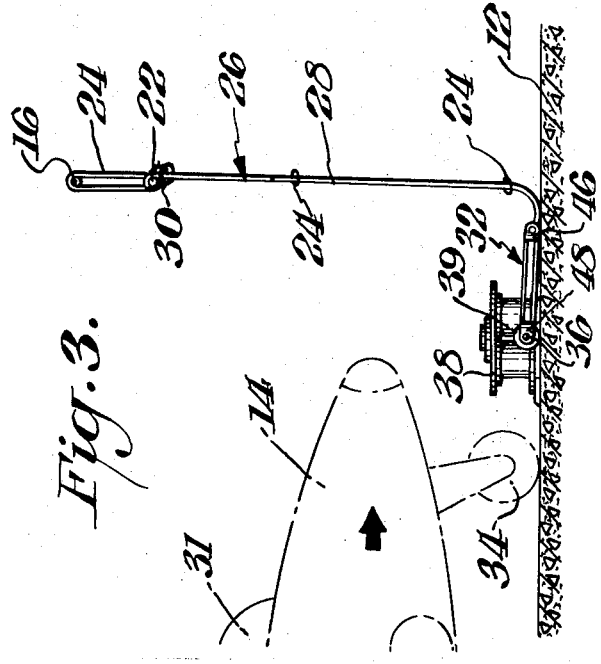

To Arrester

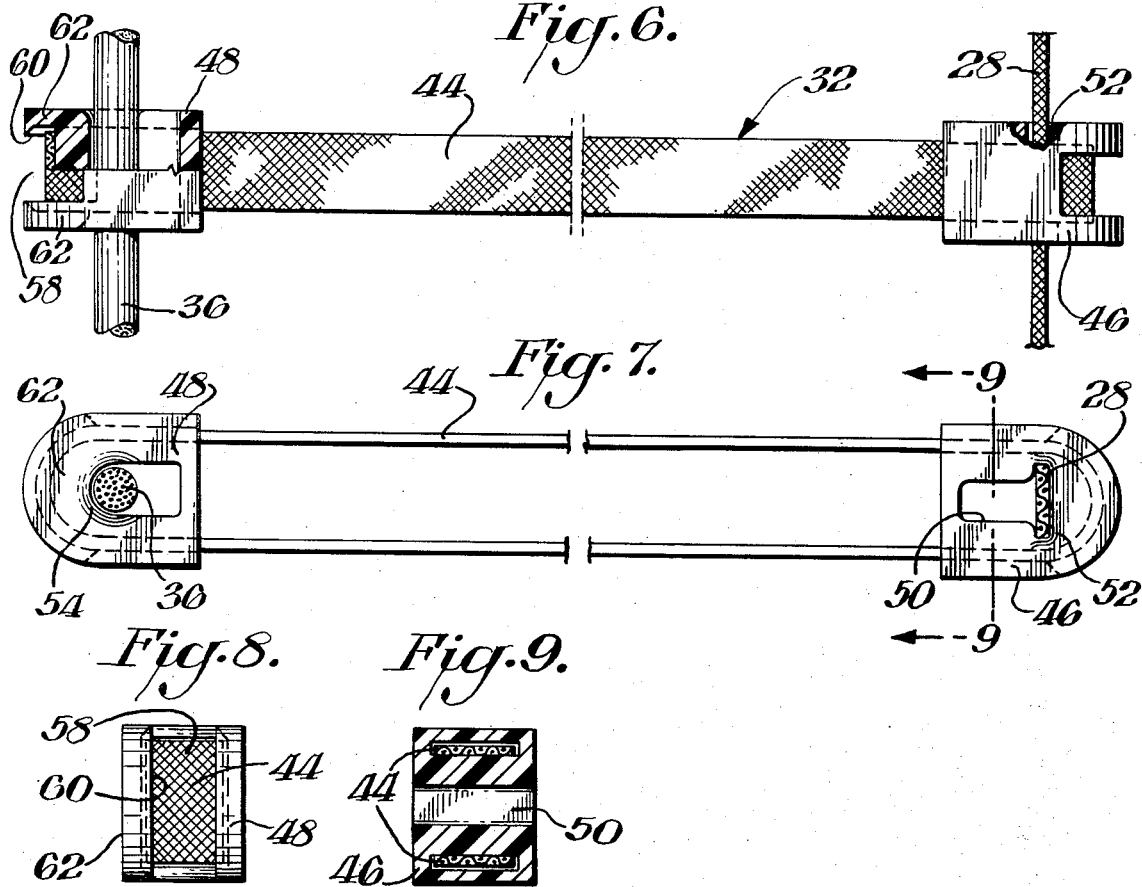

AIRCRAFT ARRESTING BARRIER

BACKGROUND OF THE INVENTION

Compound barrier nets for arresting landing aircraft distribute the loads and shocks relatively evenly about it, but still may damage protruding weaker portions of the aircraft or may injure the pilot. Such damage is predominantly caused by contact of upper portions of the barrier on the plane. An object of this invention is to provide a barrier net for arresting aircraft which evenly distributes the arresting load to larger dimensional and stronger portions of the aircraft thus minimizing the danger of damaging the aircraft and of injuring occupants.

SUMMARY OF THE INVENTION

In accordance with this invention an array of flexible aircraft arresting loops is detachably suspended across the runway with their lower ends connected to a cross runway linear component attached to an energy absorbing device. Enough of the loops are provided to engage a substantial number of them with an aircraft which impinges upon and penetrates any portion of the barrier. The loops then break away from the suspension line and move about larger dimensional portions of the aircraft and apply the restraint of the energy absorbing device from behind and below it. The loops have a maximum dimension large enough to permit passage of protruding portions of the aircraft, such as slightly less than the projected wingspread and small enough to engage the larger dimensional stronger portions, such as from 60–90 percent or 75–85 percent of the aircraft wingspan. They are, for example, efficiently deployed in a peaked configuration with their sides breakably connected to each other in a plurality of staggered lateral arrays. An upper suspension line or lines may support an adequate multiplicity of loops and the lower ends of each array may be slidably connected to the same horizontal cross runway line. These lines may be bunched together to facilitate optional engagement by a hook-equipped aircraft when the barrier is lowered. The suspension lines and loops may be made of relatively unyielding materials and the horizontal cross runway line of a relatively elastic material, such as nylon.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 1 is a front view in elevation of a portion of an aircraft-arresting barrier which is one embodiment of this invention;

FIG. 3 is a side view in elevation of one loop of the barrier net shown in FIGS. 1 and 2 just prior to engagement by an aircraft;

FIG. 4 is a side view in elevation of the loop shown in FIG. 3 as it is being engaged by an aircraft;

FIG. 6 is top plan view partially in cross section of a slide connector utilized in the embodiment shown in FIGS. 1–5;

FIG. 7 is a side view in elevation of the slide connector shown in FIG. 6;

FIG. 8 is a left-end view of the slide connector shown in FIG. 7; and

FIG. 9 is a cross-sectional view taken through FIG. 7 along the line 9—9.

DESCRIPTION OF THE PREFERRED EMBODIMENT

Figure 2:
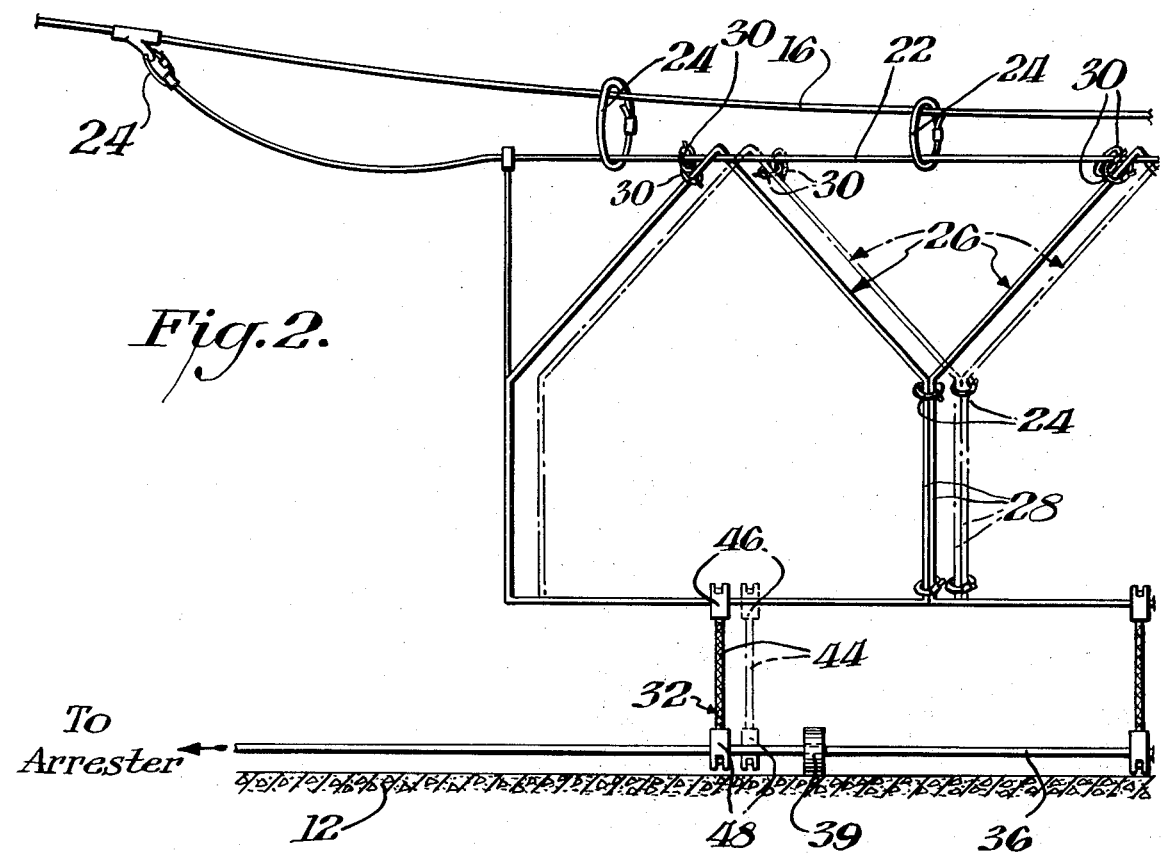
FIG. 2 is an enlarged front view in elevation of one side of the partial barrier shown in FIG. 1, with the bottoms of the barrier loops swung up off the runway to facilitate illustration.

In FIG. 1 is shown a portion of a barrier net 10 suspended across airport runway 12 in position for engagement by aircraft 14, which is for example a swept back delta wing military jet aircraft. Barrier net 10 includes an upper suspension line 16 supported in a catenary across stanchions 18 at the sides of runway 12. Stanchions 18 are, for example, raised and lowered on pivoted bases 20, such as described in U. S. Pat. No. 3,468,500. Suspension line 16 is, for example, made of a relatively unyielding textile material, such as Dacron. Dacron is the trademark for a synthetic fiber made by E. I. duPont de Nemours and Co. of Wilmington, Del., by the condensations of dimethyl terephthalate and ethylene glycol. Suspension line 16 is thus effectively provided by a 5/8 inch diameter, 8-strand plaited Dacron rope having a high breaking strength. Line 16 may also be provided by a combination of 1/4 inch steel cable in a nylon sheath.

A pair of intermediate suspension lines 22 are suspended in a substantially level line below main suspension line 16 by breakable tie loops 24 which are for example made of thin undrawn nylon. Breakable loops 24 and later described ties 30, also may be conveniently provided by a self-locking strap such as described in U.S. Pat. Nos. 205,940 and 3,186,047. Intermediate lines 22 are also detachably connected to main suspension line 16 by a similar breakable connector 24.

Barrier 10 includes a number of laterally assembled arrays 26 of loops 28 deployed in a peaked pentagonal configuration across runway 12 by looping of their peaked upper sections over suspension lines 22. A pair of breakable ties 30 hold loops 28 in position until the arrested aircraft breaks them free. One tie is secured about a portion of loop 28 near its peak and another tie 30 attaches the tail of the first-mentioned tie 30 to intermediate suspension line 22. This arrangement insures that loops 28 hold in place on line 22 without sliding wear occurring until the entire assembly is broken free by an egaged aircraft. Loops 28 for example are made of a relatively unyielding flexible material, such as Dacron, having a breaking strength of approximately 10,000 lbs. Loops 28 are breakably connected side-by-side by additional breakable straps 24 which in conjunction with upper slide connections 30 maintain loops 28 deployed as shown in FIG. 1. FIG. 1 shows one array 26 of laterally connected loops 28 in solid outline. Barrier 10, however, also includes a multiplicity of staggered arrays 26, as indicated in phantom outline, by staggered loops 28A and B shown at the right-hand side of FIG. 1.

An efficient barrier net 10 for example includes approximately eighteen arrays 26 of loops evenly staggered relative to each other across a runway, which is approximately 150 to 200 feet wide. Each loop 28 has a developed length of for example approximately 50 feet and, in the pentagonal or house configuration shown in FIG. 1, has a width of approximately 12 feet and an overall height of approximately 16 feet. Loops 28 are thus large enough to allow protruding portions of the aircraft to pass through it and small enough to securely engage the larger and stronger portions of the aircraft, such is from 60–90 percent or 75–85 percent of the aircraft wingspan. Loops 28 are thus from about 30 to 70 feet in developed length or for example from 50 to 60 feet for average sized aircraft.

As shown in FIG. 3, a slide connector 32 is horizontally disposed on runway 12 extending in back of and substantially perpendicularly to the vertical deployment of loops 28 for a distance of approximately 5 feet in back of loop 28. This rearward disposition of slide connector 32 extends the length of loop 28 to permit nose wheel 34 of aircraft 14 to pass over horizontal linear component 36, to which the rear of slide element 32 is connected, before loops 28 engage under aircraft 14.

Cross runway lines 36 (one for each array 26) are connected at both sides of runway 12 to an energy absorber 38, which is for example of the type described in U. S. Pat. No. 3,172,625 having a payout element 40 of nylon tape. In the illustrated embodiment of this invention a cross runway line 36 is provided for each of arrays 26 of loops 28 and a slide connector 32 slidably connects each of loops 28 in an array 26 with the same linear component 36. For eighteen arrays 26, the same number of linear components 36 are provided. These eighteen linear elements 36 each have their ends attached by tape connector 42 to nylon tape 40.

Linear components 36 may be supported a slight distance above the surface of runway 12, for example, by annular discs 39 as described in U. S. Pat. No. 3,010,683, to facilitate engagement of the bundle of horizontal lines 36 by an arresting hook of an aircraft so equipped when barrier net 10 is lowered out of the way. It is not necessary for a horizontal line to be provided for each of arrays 26 if sufficient adjusting movement of loops 28 is accommodated by sliding connection to a lesser number of horizontal lines 36. Lines 36 are, for example, made of an energy-absorbing material, such as nylon. Lines 36 may be made of braided nylon rope, twisted rope or webbing, and most effectively of double braided nylon rope as described in U. S. Pat. No. 3,456,908.

FIG. 4 shows the nose of aircraft 14 extending through a loop 28 and engaging it upon its wing whereby upper tie strap 24 holding intermediate suspension line 22 to main suspension line 16 is broken to limit the restraint upon loop 28 to that provided by lower horizontal cross runway line 36 through slide connector 32.

FIGS. 6–9 show slide connector 32 in detail with web 44, made for example of 10,000 lb. breaking strength Dacron looped around sliding connecting bushings 46 and 48, for example made of cast polyurethane. Slide bushing 46 includes an axial slot 50 which for example has a T-shaped cross section to slidably receive the lower web of a loop 28. The outer edges of slot 50 have a rounded chamfer 52 to facilitate sliding of bushing 46 back and forth along loop 28. Rounded slot 54 in rear bushing 48 also has a rounded edge 56 about the position of horizontal line 36 to facilitate sliding movement back and forth along it. Web 44 is confined within the grooves 58 about bushings 46 and 48 under inner overhanging edges 60 of flanges 62.

Figure 5:
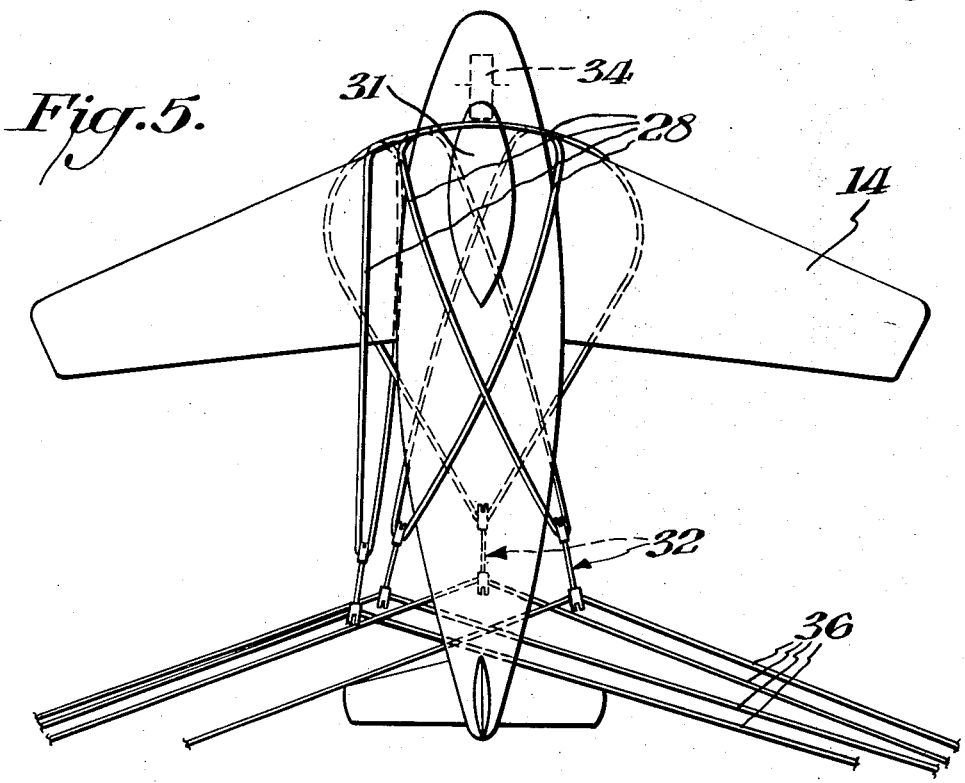
FIG. 5 is a top plan view of an aircraft being engaged by a number of loops of the aircraft arresting barrier shown in FIGS. 1–4.

FIG. 5 shows how a number of individual loops 28 of different and the same arrays 26 adjust themselves on respective horizontal linear components 36 to engage larger dimensional portions of aircraft 14 from behind and below it. Slide connectors 32 permit a large degree of lateral sliding movement of loops 28 to engage about the wings and fuselage of aircraft 14 in portions behind nose wheel 34. Loops 28 thus engage the stronger larger dimensional wings of the wings and fuselage and restrain forward movement of the aircraft with minimal contact with weaker and more damage prone portions of the aircraft, such as nose wheel 34 pilot canopy 31 and/or the tail fin (not shown) of aircraft 14. This evenly restrains forward movement of the aircraft with a minimum of danger of damage to weaker protruding portions and to the pilot.

I claim:

1. An aircraft arresting barrier for an airport runway having an energy absorbing device installed alongside comprising a flexible horizontal linear component for disposition across and adjacent the surface of said runway, connecting means for attaching said horizontal linear component to said energy absorbing device, an array of flexible aircraft arresting loops for lateral disposition across said runway, each of said loops being large enough to permit free passage of protruding portions of said aircraft and small enough to engage larger dimensional portions of said aircraft when said aircraft impinges upon said barrier device, a suspension line for disposition across said runway a predetermined distance above the vicinity of said horizontal cross runway linear component, separable ties connecting said loops to said suspension line and to each other whereby said loops are deployed across said runway in position to be engaged by said aircraft, connectors attaching lower portions of said loops to said horizontal cross runway linear component to allow said loops to engage larger dimensional and stronger portions of said aircraft and to apply the restraint of said energy absorbing device to said stronger portion of said aircraft from behind and below it.

2. An aircraft arresting barrier device as set forth in claim 1 wherein said suspension line comprises upper and intermediate suspension lines, said upper suspension line sags in a catenary over said runway, said ties suspend said intermediate suspension line from said upper suspension line, and said detachable ties varying in vertical length for substantially aligning the tops of said loops with each other across said runway.

3. A device as set forth in claim 2 wherein a pair of intermediate suspension lines are disposed below said upper suspension line, said separable ties attaching said intermediate suspension lines to said upper suspension line in a substantially straight horizontal line, and said tops of said loops being connected to said intermediate suspension lines by slide connectors.

4. A device as set forth in claim 1 wherein said loops comprise a number of laterally connected arrays of loops disposed across said runway with said arrays being staggered relative to each other to provide a multiplicity of loops disposed across said runway, said horizontal linear component including a separate cross runway line for each of said arrays, and one of said connectors attaching each of said loops in an array to the same one of said cross runway lines.

5. A device as set forth in claim 4 wherein said loops are substantially vertically deployed and said slide connectors are substantially horizontally deployed.

6. A device as set forth in claim 1 wherein each of said loops is deployed in a peaked configuration from said suspension line.

7. A device as set forth in claim 6 wherein said peaked configuration is pentagonal.

8. A device as set forth in claim 1 wherein each of said loops comprises a relatively strong flexible webbing.

9. A device as set forth in claim 8 wherein said flexible webbing is a substantially unyielding webbing.

10. A device as set forth in claim 1 wherein said horizontal linear element comprises a substantially elastic energy absorbing material.

11. A device as set forth in claim 10 wherein said energy absorbing material comprises a braided rope.

12. A device as set forth in claim 11 wherein said braided rope comprises nylon.

13. A device as set forth in claim 12 wherein said nylon braided rope comprises double braided nylon rope.

14. A device as set forth in claim 1 wherein each of said connectors comprises a pair of bushings and an extension line joining said bushings to each other.

15. A device as set forth in claim 14 wherein said bushings have outer flanges and said extension line is a loop of webbing mounted about said bushings between said flanges.

16. A device as set forth in claim 15 wherein said flanges have inner overhanging edges locking said webbing between them.

17. A device as set forth in claim 16 wherein said metallic cable has a relatively soft sheath.

18. A device as set forth in claim 1 wherein said loops have a maximum dimension from about 60–90 percent of the wingspan of the aircraft to be arrested.

19. A device as set forth in claim 18 wherein said loops have a maximum dimension from about 75–85 percent of the wingspan of the aircraft to be arrested.

20. A device as set forth in claim 1 wherein said suspension line comprises a metallic cable.

21. A device as set forth in claim 1 wherein said connectors comprise slide connectors to facilitate adjusting movement of said loops whereby they are advantageously distributed upon said aircraft.

* * * * *